United States Patent
Li et al.

(10) Patent No.: US 6,397,181 B1
(45) Date of Patent: May 28, 2002

(54) METHOD AND APPARATUS FOR VOICE ANNOTATION AND RETRIEVAL OF MULTIMEDIA DATA

(75) Inventors: Haizhou Li; Jiankang Wu; Arcot Desai Narasimhalu, all of Singapore (SG)

(73) Assignee: Kent Ridge Digital Labs, Singapore (SG)

( * ) Notice: Subject to any disclaimer, the term of this patent is extended or adjusted under 35 U.S.C. 154(b) by 0 days.

(21) Appl. No.: 09/319,319
(22) PCT Filed: Jan. 27, 1999
(86) PCT No.: PCT/SG99/00006
§ 371 (c)(1), (2), (4) Date: Jun. 4, 1999
(87) PCT Pub. No.: WO00/45375
PCT Pub. Date: Aug. 3, 2000
(51) Int. Cl.[7] .............................................. G10L 15/14
(52) U.S. Cl. ........................................ 704/256; 704/257
(58) Field of Search ................................. 704/200, 270, 704/275, 235, 257, 255, 256, 251, 231

(56) References Cited

U.S. PATENT DOCUMENTS 5,835,667 A * 11/1998 Wactlar et al. ................ 386/96
6,185,527 B1 * 2/2001 Petkovic ...................... 704/231

OTHER PUBLICATIONS

1999 IEEE 3rd Work on Multimedia Signal Processing. Maison et al., Audio–Visual speaker recognition for video broadcast news: some fusion techniques. pp. 161–167. Sep. 1999.*

ICIP 98 Proceedings. 1998 International Conference on Image Precessing. Tsekeridou et al., Speaker dependent video indexing based on audio–visual interaction. 358–362 vol. 1. Oct. 1998.*

ICASSP–97. 1997 IEEE International Conference on Acoustics, Speech and Signal Processing. Roy et al., "Speaker indentification based text to audio alignment for an audio retrieval system" pp. 1099–1102 vol. 2. Apr. 1997.*

* cited by examiner

Primary Examiner—Richemond Dorvil
(74) Attorney, Agent, or Firm—Nath&Associates PLLC; Harold L. Novick

(57) ABSTRACT

A method, an apparatus, a computer program product and a system for voice annotating and retrieving digital media content are disclosed. An annotation module (420) post annotates digital media data (410), including audio, image and/or video data, with speech. A word lattice (222) can be created from speech annotation (210) dependent upon acoustic and/or linguistic knowledge. An indexing module (430) then indexes the speech-annotated data (422). The word lattice (222) is reverse indexed (230), and content addressing (240) is applied to produce the indexed data (432, 242). A speech query (474) can be generated as input to a retrieval module (480) for retrieving a segment of the indexed digital media data (432). The speech query (474, 310) is converted into a word lattice (322), and a shortlist (344) is produced from it (322) by confidence filtering (330). The shortlist (344) is input to a lattice search engine (350) to search the indexed content (342) to obtain the search result (352).

71 Claims, 6 Drawing Sheets

METHOD AND APPARATUS FOR VOICE ANNOTATION AND RETRIEVAL OF MULTIMEDIA DATA

FIELD OF THE INVENTION

The present invention relates to databases, and in particular to systems for conveniently creating, indexing and retrieving media content including audio, image and video data and other time-sequence data, from a repository of media content.

BACKGROUND

With the advent of the Internet and the proliferation of digital multimedia technology, vast amounts of digital media content are readily available. The digital media content can be time-sequence data including audio and video data. Databases of such digital media content have grown to voluminous proportions. However, tools for conveniently and effectively storing such data for later retrieval and retrieving the data have not kept abreast of the development in the volume of such data.

Attempts have been made to manage databases of video data. However, such systems are characterised by being difficult to achieve automatic and convenient indexing and retrieval of media information. Further, such systems typically have a low level of retrieval accuracy. Therefore, a need clearly exists for an improved system of indexing and retrieving media content.

SUMMARY

In accordance with a first aspect of the invention, there is disclosed a method of voice annotating digital media data. The method includes the steps of: speech annotating one or more portions of the digital media data; and indexing the digital media data and speech annotation to provide indexed media content.

Preferably, the method also includes the step of creating a word lattice using the speech annotation. It may also include the step of recording the speech annotation separately from the digital media data. Optionally, the speech annotation is generated using a formal language. Further, the annotating step can be dependent upon at least one of a customised vocabulary and Backus-Naur Form grammar. Still further, the step of creating the word lattice may be dependent upon at least one of acoustic and linguistic knowledge.

Preferably, the method includes the step of reverse indexing the word lattice to provide a reverse index table. It may also include the step of content addressing the reverse index table.

In accordance with a second aspect of the invention, there is disclosed an apparatus for voice annotating digital media data. The apparatus includes: a device for speech annotating one or more portions of the digital media data; and a device for indexing the digital media data and speech annotation to provide indexed media content.

In accordance with a third aspect of the invention, there is disclosed a computer program product having a computer readable medium having a computer program recorded therein for voice annotating digital media data. The computer program product includes: a module for speech annotating one or more portions of the digital media data; and a module for indexing the digital media data and speech annotation to provide indexed media content.

In accordance with a fourth aspect of the invention, there is disclosed a method of voice retrieving digital media data annotated with speech. The method includes the steps of: providing indexed digital media data, the indexed digital media data derived from a word lattice created from speech annotation of the digital media data; generating a speech query; and retrieving one or more portions of the indexed digital media data dependent upon the speech query.

Preferably, the method further includes the step of creating a word lattice from the speech query. The word lattice may be created dependent upon at least one of acoustic and linguistic knowledge. The method may also include the step of searching the indexed media data dependent upon the speech query by matching the word lattice created from the speech query with word lattices of the indexed media data. It may also include the step of confidence filtering the lattice created from the speech query to produce a short-list for the searching step.

Optionally, the method further includes the step of searching the indexed digital media data dependent upon a text query. Further, the speech query can generated dependent upon at least one of a customised vocabulary and Backus-Naur Form grammar.

In accordance with a fifth aspect of the invention, there is disclosed an apparatus for voice retrieving digital media data annotated with speech. The apparatus includes: a device for indexed digital media data, the indexed digital media data derived from a word lattice created from speech annotation of the digital media data; a device for generating a speech query; and a device for retrieving one or more portions of the indexed digital media data dependent upon the speech query.

In accordance with a sixth aspect of the invention, there is disclosed a computer program product having a computer readable medium having a computer program recorded therein for voice retrieving digital media data annotated with speech. The computer program product includes: a module for providing indexed digital media data, the indexed digital media data derived from a word lattice created from speech annotation of the digital media data; a module for generating a speech query; and a module for retrieving one or more portions of the indexed digital media data dependent upon the speech query.

In accordance with a seventh aspect of the invention, there is disclosed a system for voice annotating and retrieving digital media data. The system includes: a device for speech annotating at least one segment of the digital media data; a device for indexing the speech-annotated digital media data to provide indexed digital media data; a device for generating a speech or voice query; and a device for retrieving one or more portions of the indexed digital media data dependent upon the speech query.

Preferably, the system also includes a device for creating a lattice structure from speech annotation. This device can be dependent upon acoustic and/or linguistic knowledge.

Preferably, the speech-annotating device post-annotates the digital media data. The speech annotation can be generated using a formal language.

The systems can also include a device for reverse indexing the lattice structure to provide a reverse index table. Still further, it may include a device for content addressing the reverse index table.

Preferably, the system includes a device for creating a lattice structure from the speech query. It may also include a device for searching the indexed digital media data dependent upon the speech query by matching the lattice structure created from the speech query with lattice structures of the indexed digital media data. The system may also include a device for confidence filtering the lattice structure created from the speech query to produce a short-list for the searching device. The lattice structure can be created dependent upon at least one of acoustic and linguistic knowledge. Still further, the system may include a device for searching the indexed digital media data dependent upon a text query.

Preferably, at least one of the annotating device and the speech query is dependent upon at least one of a customised vocabulary and Backus-Naur Form grammar.

BRIEF DESCRIPTION OF THE DRAWINGS

A small number of embodiments of the invention are described hereinafter with reference to the drawings, in which.

DETAILED DESCRIPTION

A method, an apparatus, a computer program product and a system for voice annotating and retrieving multimedia data are described. In the following description, numerous details are set forth including specific content-addressing techniques like hashing, for example. It will be apparent to one skilled in the art, however, that the present invention may be practised without these specific details. In other instances, well-known features are not described in detail so as not to obscure the present invention.

The embodiments of the invention provide a voice-based system of annotating multimedia data including audio, image and video data and of retrieving the same from a database. Speech is the most natural means of communication for humans. As such, speech is likely to play a significant role in defining the next-generation of interfaces to data resources including media content. The embodiments of the invention utilise a voice-centric interface for accessing and retrieving media data.

In the following description, components of the system are described as modules. A module, and in particular its functionality, can be implemented in either hardware or software. In the software sense, a module is a process, program, or portion thereof, that usually performs a particular function or related functions. In the hardware sense, a module is a functional hardware unit designed for use with other components or modules. For example, a module may be implemented using discrete electronic components, or it can form a portion of an entire electronic circuit such as an Application Specific Integrated Circuit (ASIC). Numerous other possibilities exist. Those skilled in the art will appreciate that the system can also be implemented as a combination of hardware and software modules.

Figure 4A:
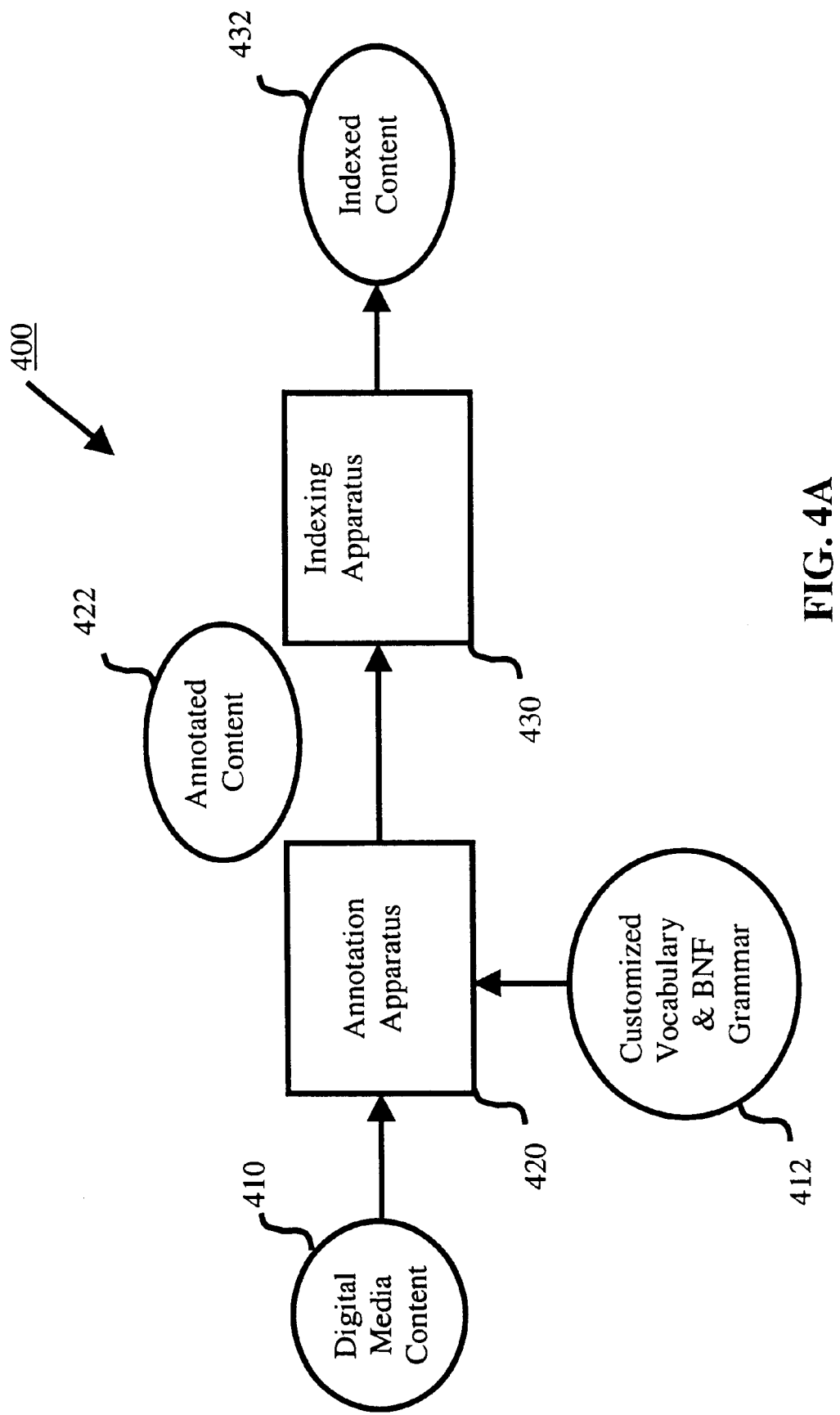
FIGS. 4A and 4B are high-level block diagrams of a voice-based system for indexing and retrieving media content in accordance with the first embodiment of the invention.
Figure 4B:
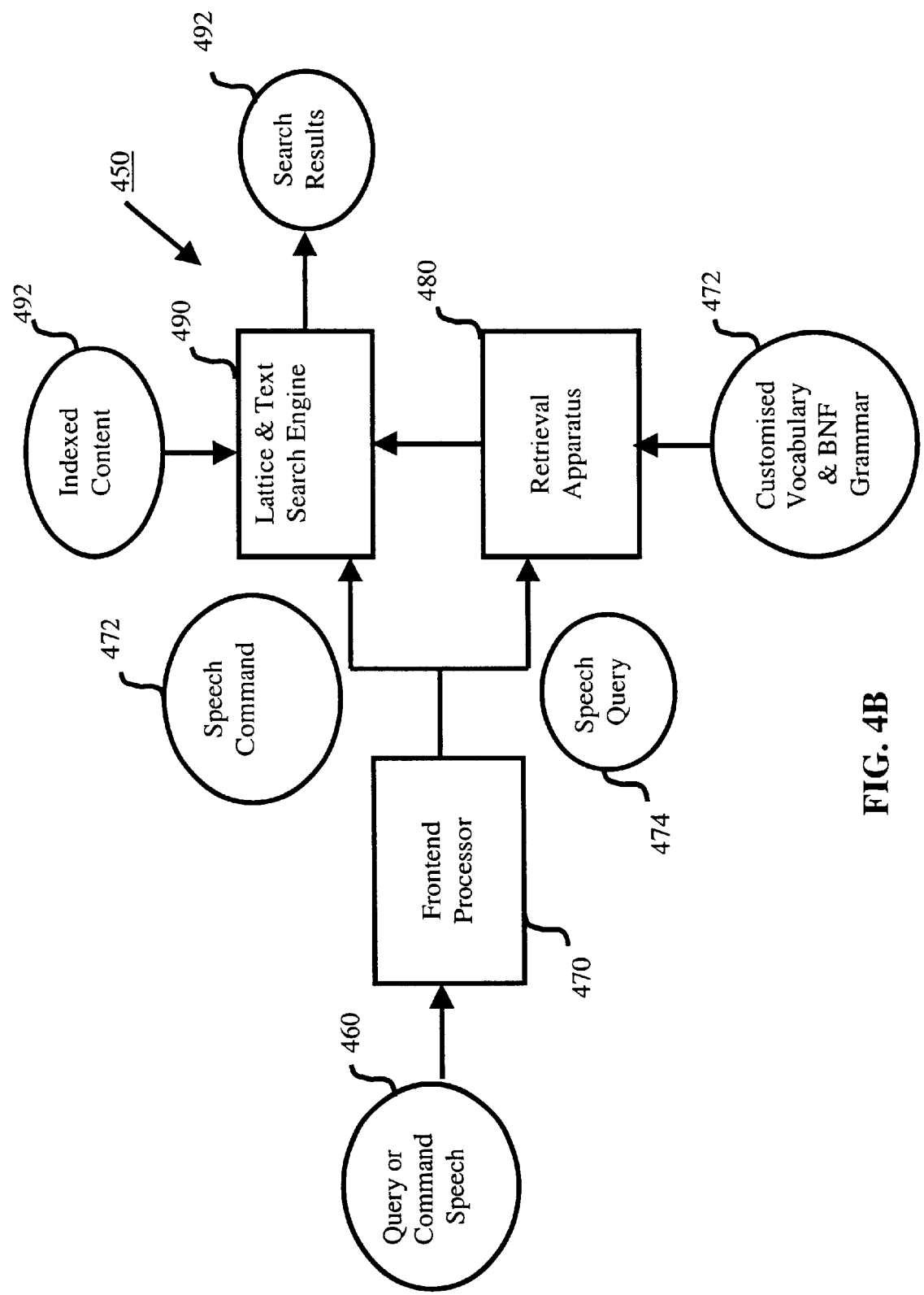

FIGS. 4A and 4B are high-level block diagrams illustrating modules of the first embodiment. These diagrams depict a voice-based system for indexing and retrieving media content. The media data, with which it is practised, can include audio, image and video data. It may also be practised with other such time-sequence data.

FIG. 4A illustrates the voice annotation and indexing system 400, which voice annotates raw digital media content 410, preferably using a formal descriptive language. The digital content 410 is provided as input to an annotation module 420. Both a customised vocabulary and BNF grammar 412 can be defined for the descriptive language and provided as input to the annotation module 420. The annotation module 420 produces voice-annotated content 422 as its output, which is provided to an indexing module 430. The indexing module 430 produces indexed content 432 for the media data as its output. The indexed content 432 can be stored for retrieval.

Figure 1:
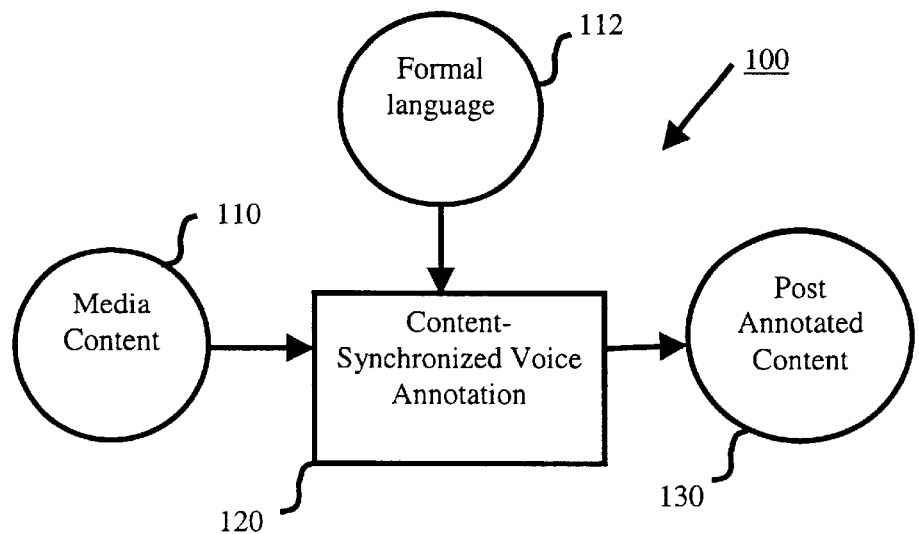
FIG. 1 is a detailed block diagram of a voice-annotation module according to a first embodiment of the invention.

FIG. 1 is a more detailed block diagram of the annotation module 100 (420). The module 100 (420) post annotates the content of the media data 410. A speaker or narrator reviews the content 410 during playback and annotates it with speech using a formal descriptive language. As shown in FIG. 1, the media content 110 and the formal-language annotation 112 are provided as input to a content-synchronised voice annotation module 120, which produces the post-annotated content 130.

Original annotation, such as a narrator's voice in the media content 110, usually mixes with other background sounds in the media content 110, which complicates the voice indexing processing. Further, narration sometimes is not relevant to the actual media content 110, and it can be difficult for a computer to understand. Still further, portions of the media content 110 may not have any accompanying sound track.

Therefore, post-annotation is preferably used as an alternative to the original sound track. The post annotation can be recorded separately and may be cleaner and more relevant, thereby ensuring easier and more accurate retrieval. The post-annotation is used as the index of the media content 110 in the content retrieval module (450 of FIG. 4B).

The voice-annotation module 100 includes a reproduction device for reproducing the media content for presentation to a user and a synchronised annotating mechanism, so that the narrator's speech or voice annotation 112 is correctly aligned with the flow of the media content 110.

As mentioned hereinbefore, a formal language 112 is preferably used to voice or speech annotate the media content 110. This is done to annotate the media content 110 in a professional manner and to facilitate the retrieval of media content afterwards. A formal language 112 is defined to be spoken in a professional way and using a restricted grammar. That is, the formal language 112 preferably has low complexity. The vocabulary may not be limited, but regular expressions and collocations are used intensively. Table 1 illustrates a sample language, defined in Backus-Naur Form (BNF) 412 (482).

TABLE 1

Sample BNF := [Time|Place|People|Event|Topic]
Time:[January|February|March|April|May|June|July|August|September|October|November|December]
Topic:[Finance|International relations|History|Geographic]

The BNF can be customised to a specific topic or a specific speaker/narrator. However, once it is defined, it is encouraged to consistently stick to the customisation in the process of annotation. The BNF contained in Table 1 is merely illustrative, and numerous variations can be practised by those skilled in the art in view of this disclosure without departing from the scope and spirit of the invention.

Figure 2:
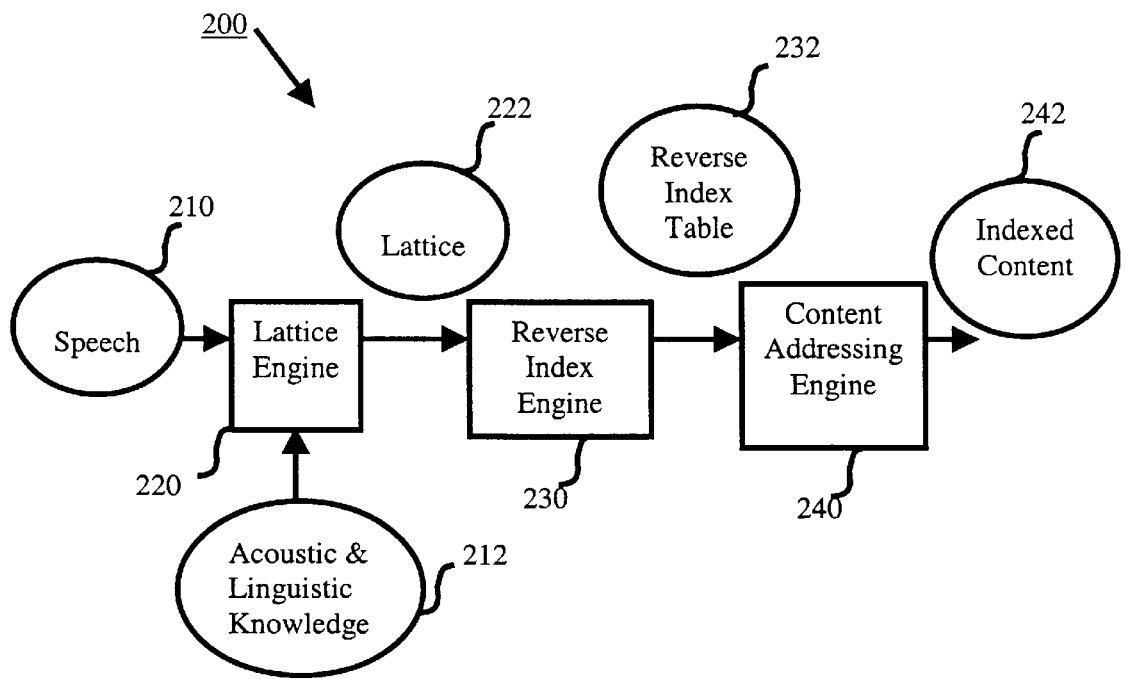
FIG. 2 is a detailed block diagram of a lattice-indexing module according to the first embodiment of the invention.

FIG. 2 is a more detailed block diagram of the indexing module 430, which is preferably implemented as a lattice-indexing module 200. The indexing module 200 converts speech 210 (i.e., the post annotation 130 or 422) into an indexed content 242 (or 432), so that a media-content segment can be quickly retrieved subsequently. Preferably, the speech 210 is in pulse-code modulated (PCM) format, although other formats may be used without departing from the scope and spirit of the invention. A lattice engine module 220 receives the speech 210 and acoustic & language knowledge 212 as input and converts the speech or annotation 210 into a lattice structure 222, where the hypotheses of speech transcriptions are kept. A word lattice contains a large vocabulary of likely matching words and can be seen as a linguistic representation of the input continuous speech.

Acoustic and language knowledge is used by two major components in a common automatic speech recognition (ASR) mechanism. This mechanism is referred to as lattice engine 220 hereinafter and can be thought of as "the ear and brain". A natural "ear" transcribes speech into phonetic notes, and the "brain" understands the phonetic notes with its language knowledge. Thus, automatic speech recognition serves as a means in a user interface, so users can issue common commands in a natural way. That is, speech utterances result in computer actions. The system is able to react to incomplete or inexact in which command words are embedded. Preferably, a voice-command interpreter is used to interpret (and "understand") the commands. A rejection mechanism can also be provided in the interpreter only to accept commands of high confidence. Input that is interpreted as "no idea" is rejected and is provided as a separate output, and this output will request for a new input of speech utterances.

The data structure of acoustic knowledge, or acoustic model, is preferably a hidden Markov model (HMM), which is used in speech recognition. The acoustic knowledge represents a human voice in a given number of phonetic states and their transitions. For example, the word "LAST" is encoded as a four-phoneme string, /L-AE-S-T/, and each of the phonemes is modelled by a HMM. In the process, the ASR mechanism or lattice engine 220 translates the raw speech data (210), which again is preferably in PCM format, into those phonetic states and their transitions that are kept in a lattice.

The data structure of language knowledge is preferably an N-gram statistical language model that describes word usage of a human language. It is trained on a given text corpus to provide an estimate about the joint probability for co-occurrence of words in a word string. This language knowledge includes a vocabulary set and syntactic statistics about the word usage. The customized vocabulary & BNF Grammer that a narrator uses could be considered as part of the language knowledge mentioned above. The lattice engine 220 uses the language knowledge to search through the phonetic lattice for an understanding.

Figure 6:
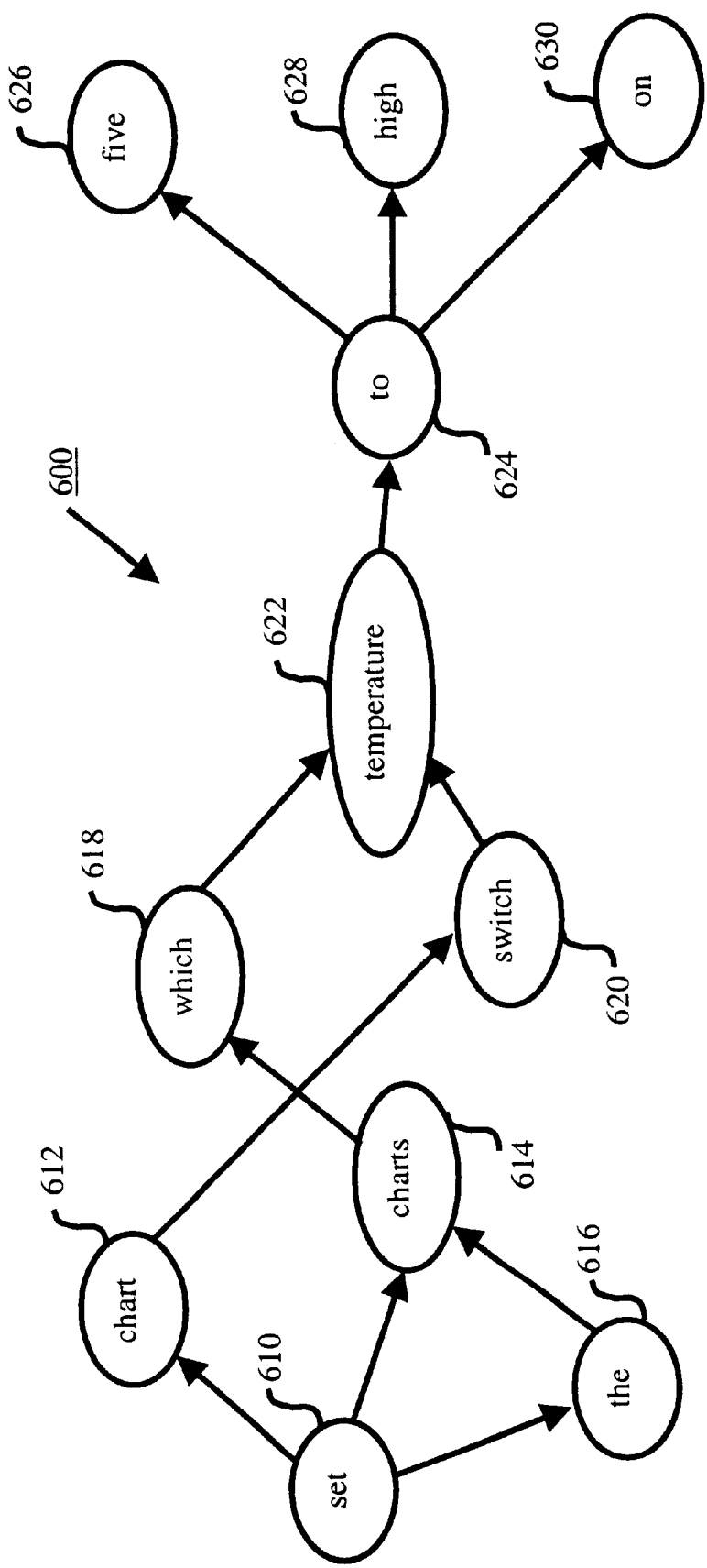
FIG. 6 is a block diagram illustrating an example of a lattice in accordance with the first embodiment.

Referring again to lattice 222, a lattice is a data structure representing an inexact understanding, where all sound-alike words are kept that are close to the input speech. For example, FIG. 6 illustrates a sample lattice 600 for input speech of "Set chart switch temperature to high". The node "set" 610 in the lattice can flow to the nodes "chart" 612, "charts" 614, or "the" 616, as indicated by the single headed arrows. The node "the" 616 can flow to "charts" 614. In turn, "charts" 614 can flow to "which" 618 and "chart" 612 can flow to "switch". 620. Both "which" 618 and "switch" 620 can flow to "temperature" 622. "Temperature" 624 flows to "to" 624. The node "to" 624 can change to "five" 624, "high" 628, or "on" 630. For the given input speech, the flow would include nodes 610, 612, 620, 622, 624 and 628. Although more than a dozen sentences might be derived from this lattice, when applying the word usage knowledge (i.e., language knowledge), a grammatical sentence is likely to be found.

The word hypotheses for a speech segment are sorted in order of a combined acoustic and linguistic likelihood according to topic-specific acoustic and linguistic knowledge 212 . A word hypothesis is an estimate or guess of a word or a given speech segment. It includes the starting and ending points of the segment, the word identity itself, and the probability of how likely this hypothesis is true. In FIG. 6, the word in the node is a word hypothesis. Note that more than one segment can be guessed to be the same word. Therefore, a node in FIG. 6 may correspond to many speech segments not shown in FIG. 6.

The top choice in the lattice 222 is expected to be the correct transcription of the speech 210. Transcription refers to the correct text script of the narrator's voice. However, if the correct one is in the second or third place in terms of the likelihood score, this is acceptable so long as the correct answer is short-listed. The lattice 222 is provided as input to a reverse-index module 230. The reverse-index module 230 builds a reversed index table 232 to index the lattice 222, so that a lattice segment, in other words, a speech segment, can be quickly retrieved using a table lookup. A reversed index table uses keywords as search keys, which are associated with relevant content addresses. The reverse-index table 232 is provided as input to a content-addressing engine module 240. To further speed up a lookup search in the reversed index table 232, content addressing techniques are applied to the table 232 by this module to produce the indexed content 242 at the output of the lattice-indexing module 200. Preferably, the content-addressing technique implemented by the engine module 240 is hashing, which is well known to those skilled in the art. Other techniques may be applied without departing from the scope and spirit of the invention.

A block diagram of a voice-based retrieval system 450 according to the first embodiment of the invention is depicted in FIG. 4B. To retrieve media content, a user speaks providing a query or command speech 460 as input to the retrieval system 450. There are two types of speech: a query and a command. The speech 460 is input to a front-end processor module 470, which recognises and interprets it to provide a speech query 474 or a speech command 472 at the output of module 470. If the speech 460 is a speech command 472, the front-end processor module 470 takes corresponding actions. A voice (or speech) command 472 provides an instruction to the lattice search engine module 490 to conduct certain operations for searching and browsing. The same applies to lattice search engine module 350, discussed hereinafter. A set of speech commands 472 can include STOP, NEXT, FF, PAUSE, etc., for example, like the panel buttons of a VCR player. The STOP command stops the retrieval process. The NEXT command goes to the next search result. The FF or FAST FORWARD command skims search results quickly. The PAUSE command stops at the point, as it is in order to resume the action. This is provided as input to the lattice search engine module 490, preferably the lattice and text search engine module 490.

If the speech 460 is not a speech command 472, the speech 460 is treated as a search key or query 474 and passed to a retrieval module 480 to conduct a search of the indexed content. The retrieval module 480 also preferably receives the customised vocabulary and BNF grammar 482 as additional language knowledge input. That is, the speech query 474 is preferably spoken in the same BNF grammar and customised vocabulary 482 as the one 412 of FIG. 4A used in the annotation system 400. In response to the speech query 474, the retrieval module 480 searches for the relevant media content. The retrieval module 480 provides its output to the lattice search engine module 490 as well. The lattice and text search engine module 490 receives indexed content 492 as input and provides search results 492 as its output. In the case of more than one search result, the user is preferably able to speak to the system 450 to navigate the list of answers using a speech command 472.

Figure 3:
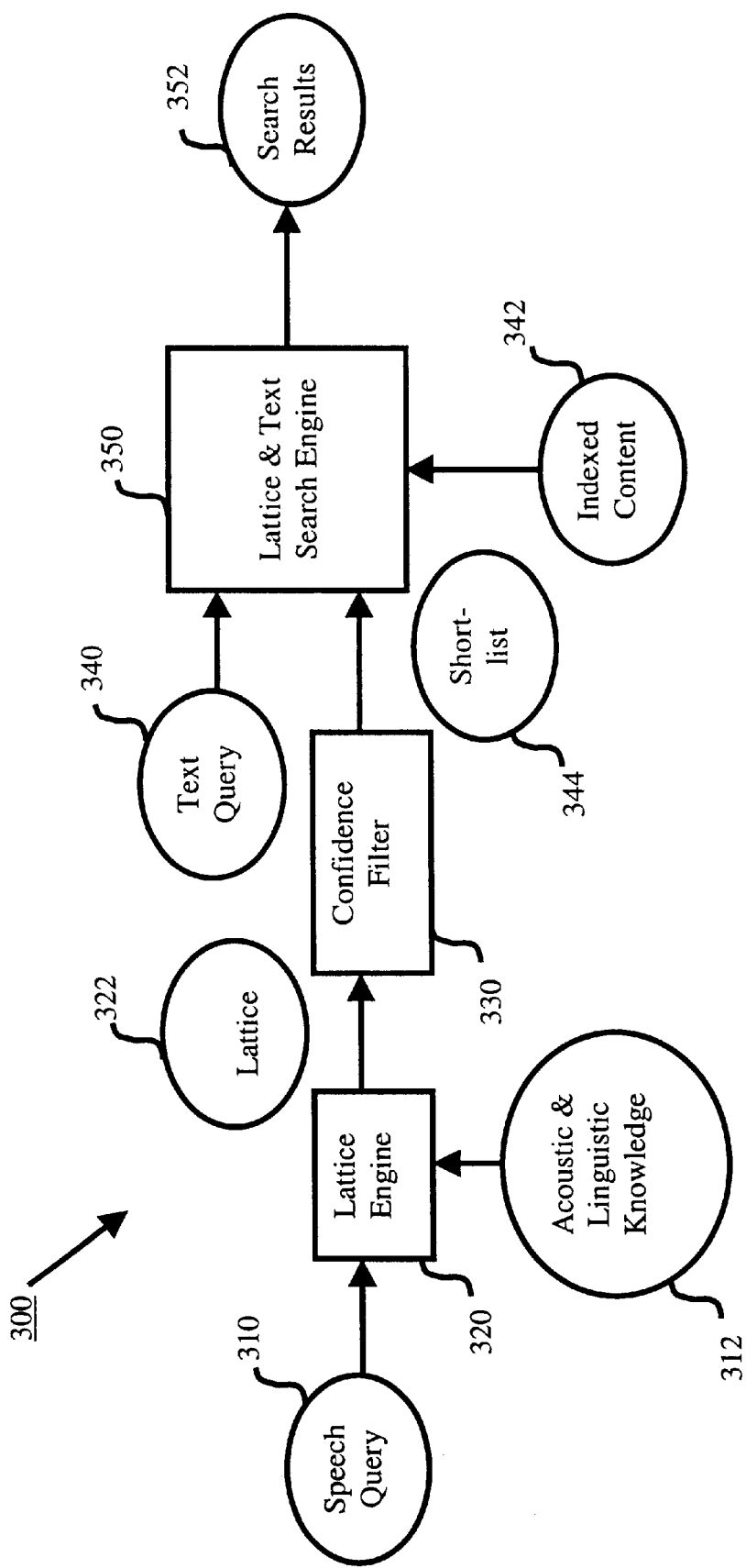
FIG. 3 is a detailed block diagram of a retrieval module 300 according to the first embodiment of the invention.

FIG. 3 is a more detailed block diagram of the retrieval module 300. (i.e., 480 of FIG. 4B). Voice commands or queries 310 are input to a lattice engine module 320, which also preferably receives acoustic and linguistic knowledge 312 as an input, to retrieve annotated media content. The voice query 310 is converted into a lattice representation 322. Similar to the lattice generation 222 by the lattice engine module 220 of FIG. 2, word hypotheses are created, which are sorted and then short-listed 344 by applying a confidence filter 330 to the, lattice 322. The word hypotheses are ranked in order of acoustic and linguistic likelihood. After passing through the confidence filter 330, the word hypotheses within a likelihood threshold are short-listed 344.

The output 344 of the confidence filter 330 and the indexed content 342 (242) produced by the lattice-indexing module 200 of FIG. 2 are input to a lattice search engine module 350. Thus, the resulting list of word hypotheses is used as a search key to retrieve content 342 in the reversed index table produced by the lattice-indexing module 200. A reverse-index table sorts the lattice segments, i.e., speech segments, according to search key words. The speech segments corresponding to a search key are listed at the entry indexed by the key word. Table 2 lists the format of an entry in the reversed index table.

TABLE 2

| Key word | Address of Speech Segment 1 | Address of Speech Segment 2 | Address of Speech Segment 3 |
| --- | --- | --- | --- |

An indexing probability for each segment is also preferably provided indicating ho likely the speech segment matches the search key (or key word) in the reversed index table. The matches of speech segments at each entry are also sorted in order of probability. For example, speech segments 1, 2, and 3 are ordered in terms of decreasing probability (i.e., high to low).

As stated hereinbefore, a word hypothesis of a speech query also comes with a probability of how likely the hypothesis is true, which is referred to as the retrieval probability. Given a list of word hypotheses of the speech query, the hypotheses are evaluated one by one against the speech segments in the entry of the reversed index table having a key word that matches the word held by the word hypothesis. A scoring approach is employed to rate the final results. For example, a combined probability of indexing and retrieval probability can be used as an indicator of how adequate the match is. The final results are also ordered in terms of the scoring for users to browse.

The search results 352 are output by the lattice (and text) search engine module 350. Optionally, the module 350 is implemented as a lattice and text search engine module 350. This permits text-based retrieval of the indexed content 342, in which a text query 340 can be input to the lattice and text search engine module 350. The input text can be used directly as the search key. Given the fully indexed media content 342, a large volume of media content, such as audio or video records, can be retrieved as if they are text content. When a user types in text as a search key, the search process Is similar to what is described hereinbefore. However, the list of word hypotheses has a single word with a retrieval probability of 1.0. Thus, after media content is indexed, the retrieval system permits a user to speak or type key words to retrieve indexed content 342. In other words, one is able to retrieve by voice or by text.

The foregoing embodiments of the invention are advantageous in that spoken commands can be used to annotate and retrieve any time-sequence data including audio, image and video data. This is preferably done using a query language capable of standardisation. The use of a formal descriptive language significantly increases the accuracy of the indexing and retrieval processes. Importantly, by means of voice annotation, the system is able to index media data conveniently and readily. Still further, a user can search and navigate the indexed content by voice and text commands or queries. Customised acoustic and linguistic knowledge, such as vocabulary and BNF grammar, enhances the indexing and retrieval performance. After the annotation and indexing process, the customised knowledge is associated with the indexed content for ease of reference during retrieval. Advantageously, the indexing process includes generating a lattice, creating a reverse index table and storing the reverse index table using a content-addressing technique.

Optionally using voice verification, the system can be personalised to use person vocabulary and settings and be secure at the same time. Speaker verification serves as a means of user authentication for privacy protection and system personalisation. A speaker has a distinct voice print which can be used as a personalised code for user authentication. In this manner, the system can verify a user's identity by the person's voice characteristics. A user registers their voice with the system by uttering prompted text, instead of using traditional text-based passwords, to produce a voice print models. Access is then controlled to the system by a verification process using the user's voice print. An unknown speaker must read prompted text and the speaker verification checks the speech against the voice print models. Once a user is identified, personalised services such as user-dependent vocabularies and user preference environment setups can be provided.

Figure 5:
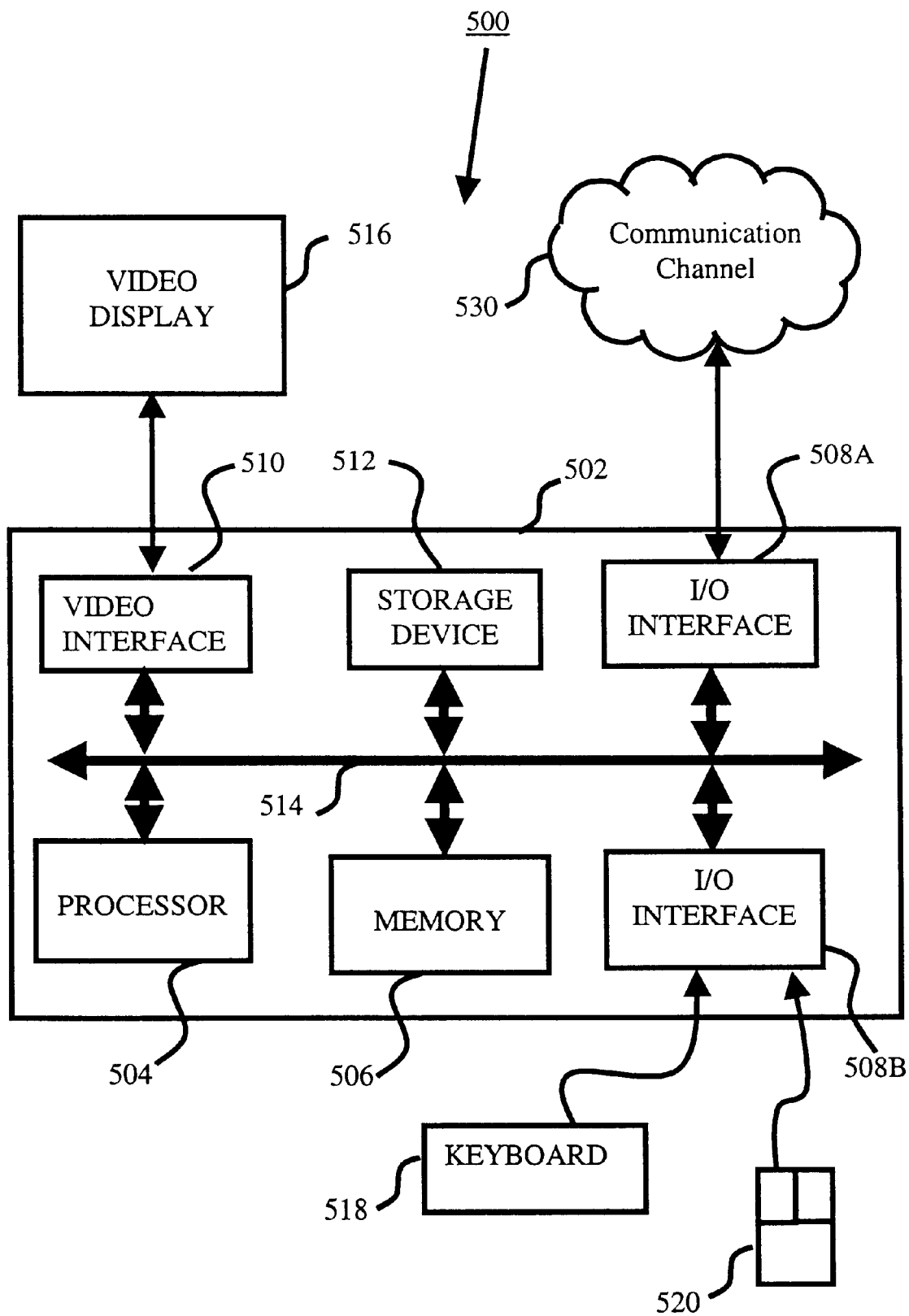
FIG. 5 is a block diagram of an example of a computer system, with which the embodiments can be practised.

As described hereinbefore, the embodiments of the invention can be implemented using a computer system, such as the general-purpose computer shown in FIG. 5. In particular, the modules of FIGS. 4A and 4B can be implemented as software, or a computer program, executing on the computer. The method or process steps for voice annotating, indexing and retrieving digital media content are effected by instructions in the software that are carried out by the computer. Again, the software may be implemented as one or more modules for implementing the process steps. That is, a module is a part of a computer program that usually performs a particular function or related functions.

In particular, the software may be stored in a computer readable medium, including the storage devices described hereinafter. The software is loaded into the computer from the computer readable medium and then the computer carries out its operations. A computer program product includes a computer readable medium having such software or a computer program recorded on it that can be carried out by a computer. The use of the computer program product in the computer preferably effects advantageous apparatuses for voice annotating, indexing and retrieving digital media content in accordance with the embodiments of the invention.

The computer system 500 includes the computer 502, a video display 516, and input devices 518, 520. In addition, the computer system 500 can have any of a number of other output devices including line printers, laser printers, plotters, and other reproduction devices connected to the computer 502. The computer system 500 can be connected to one or more other computers via a communication interface 508A using an appropriate communication channel 530 such as a modem communications path, an electronic network, or the like. The network may include a local area network (LAN), a wide area network (WAN), an Intranet, and/or the Internet.

The computer 502 includes: a central processing unit(s) (simply referred to as a processor hereinafter) 504, a memory 506 that may include random access memory (RAM) and read-only memory (ROM), input/output (IO) interfaces 508A and 508B, a video interface 510, and one or more storage devices generally represented by a block 512 in FIG. 5. The storage device(s) 512 can consist of one or more of the following: a floppy disc, a hard disc drive, a magneto-optical disc drive, CD-ROM, magnetic tape or any other of a number of non-volatile storage devices well known to those skilled in the art.

Each of the components 504 to 512 is typically connected to one or more of the other devices via a bus 514 that in turn can consist of data, address, and control buses. Numerous other devices can be employed as part of the computer system 500 including video capture cards, scanners, sound cards, for example. Such devices can be used to obtain video, audio and image data for use by the system of FIG. 1. The video interface 510 is connected to the video display 516 and provides video signals from the computer 502 for display on the video display 516. User input to operate the computer 502 can be provided by one or more input devices via the interface 508B. For example, an operator can use the keyboard 518 and/or a pointing device such as the mouse 520 to provide input to the computer 502.

The system 500 is simply provided for illustrative purposes and other configurations can be employed without departing from the scope and spirit of the invention. Computers with which the embodiment can be practised include IBM-PC/ATs or compatibles, one of the Macintosh (TM) family of PCs, Sun Sparcstation (TM), a workstation or the like. Many such computers use graphical operating systems such as Microsoft Windows 95 and 98, for example. The foregoing is merely exemplary of the types of computers with which the embodiments of the invention may be practised. Typically, the processes of the embodiments are resident as software or a program recorded on a hard disk drive (generally depicted as block 512 in FIG. 5) as the computer readable medium, and read and controlled using the processor 504. Intermediate storage of the program and media content data and any data fetched from the network may be accomplished using the semiconductor memory 506; possibly in concert with the hard disk drive 512.

In some instances, the program may be supplied to the: user encoded on a CD-ROM or a floppy disk (both generally depicted by block 512), or alternatively could be read by the user from the network via a modem device connected to the computer, for example. Still further, the computer system 500 can load the software from other computer readable medium. This may include magnetic tape, a ROM or integrated circuit, a magneto-optical disk, a radio or infra-red transmission channel between the computer and another device, a computer readable card such as a PCMCIA card, and the Internet and Intranets including email transmissions and information recorded on web sites and the like. The foregoing is merely exemplary of relevant computer readable mediums. Other computer readable mediums may be practised without departing from the scope and spirit of the invention.

Still further, the modules of the indexing and retrieving system may be implemented as processes carried out in a distributed manner in a computer network. For example, the indexing processing and the indexed media may be provided at one or more sites in the network, and the retrieval process, or portions thereof, may be carried out at another site in the network.

In the foregoing manner, a method, an apparatus, a computer program product and a system for voice annotating and retrieving digital media content are disclosed. Only a small number of embodiments are described. However, it will be apparent to one skilled in the art in view of this disclosure that numerous changes and/or modifications can be made without departing from the scope and spirit of the invention.

What is claimed is:

1. A method of voice annotating source digital media data, said method including the steps of:
    speech annotating one or more portions of said source digital media data with a speech annotation that is independent of the source digital media data thereby providing a speech annotated digital media data; and
    indexing said speech annotated digital media data by said speech annotation to provide an indexed media content.

2. The method according to claim 1, wherein said indexing step includes the step of creating a word lattice from said speech annotation.

3. The method according to claim 2, wherein said step of creating said word lattice is dependent upon at least one of acoustic and linguistic knowledge.

4. The method according to claim 2, further including the step of reverse indexing said word lattice to provide a reverse index table.

5. The method according to claim 4, further including the step of content addressing said reverse index table.

6. The method according to claim 1, wherein said annotating step is dependent upon at least one of a customised vocabulary and Backus-Naur Form grammar.

7. The method according to claim 1, wherein said indexing step further includes the steps of:
    applying said speech annotation to a lattice engine and further applying at least one of acoustic and linguistic knowledge to said lattice engine to generate a word lattice;
    applying said word lattice to a reverse index engine to build a reversed index table for said lattice; and
    applying said reversed index table to an addressing engine module to create the indexed media content.

8. The method according to claim 7, wherein said acoustic knowledge is based on a hidden Markov model.

9. The method according to claim 7, wherein said linguistic knowledge is an N-gram statistical linguistic model.

10. An apparatus for voice annotating source digital media data, said apparatus including:
    means for speech annotating one or more portions of said source digital media data with a speech annotation that is independent of the source digital media data to provide a speech annotated digital media data; and means for indexing said speech annotated digital media data by said speech annotation to provide an indexed media content.

11. The apparatus according to claim 10, wherein said indexing means includes means for creating a word lattice from said speech annotation.

12. The apparatus according to claim 11, wherein said means for creating said word lattice is dependent upon at least one of acoustic and linguistic knowledge.

13. The apparatus according to claim 11, further including means for reverse indexing said-word lattice to provide a reverse index table.

14. The apparatus according to claim 13, further including means for content addressing said reverse index table.

15. The apparatus according to claim 10, wherein said annotating means is dependent upon at least one of a customised vocabulary and Backus-Naur Form grammar.

16. The apparatus according to claim 10, wherein said means for indexing further includes:

means for applying said speech annotation to a lattice engine and further applying at least one of acoustic and linguistic knowledge to said lattice engine to generate a word lattice;

means applying said word lattice to a reverse index engine to build a reversed index table for said lattice; and means for applying said reversed index table to an addressing engine module to create the indexed media content.

17. The apparatus according to claim 16, wherein said acoustic knowledge is based on a hidden Markov model.

18. The apparatus according to claim 16, wherein said linguistic knowledge is an N-gram statistical linguistic model.

19. A computer program product having a computer readable medium having a computer program recorded therein for voice annotating source digital media data, said computer program product including:

means for speech annotating one or more portions of said source digital media data with a speech annotation that is independent of the source digital media data to provide a speech annotated digital media data; and means for indexing said speech annotated digital media data by said speech annotation to provide an indexed media content.

20. The computer program product according to claim 19, wherein said indexing means includes means for creating a word lattice from said speech annotation.

21. The computer program product according to claim 19, wherein said means for creating said word lattice is dependent upon at least one of acoustic and linguistic knowledge.

22. The computer program product according to claim 20, further including means for content addressing said reverse index table.

23. The computer program product according to claim 20, further including means for reverse indexing said word lattice to provide a reverse index table.

24. The computer program product according to claim 19, wherein said annotating means is dependent upon at least one of a customised vocabulary and Backus-Naur Form grammar.

25. The computer program product according to claim 19, wherein said means for indexing further includes:

means for applying said speech annotation to a lattice engine and further applying at least one of acoustic and linguistic knowledge to said lattice engine to generate a word lattice;

means applying said word lattice to a reverse index engine to build a reversed index table for said lattice; and means for applying said reversed index table to an addressing engine module to create the indexed media content.

26. The computer program product according to claim 25, wherein said acoustic knowledge is based on a hidden Markov model.

27. The computer program product according to claim 26, wherein said linguistic knowledge is an N-gram statistical linguistic model.

28. A method of voice retrieving digital media data annotated with speech, said method including the steps of:

providing an indexed digital media data, said indexed digital media data derived from a word lattice created from a speech annotation of said digital media data, wherein said speech annotation is independent of a source digital media data;

generating a speech query; and retrieving one or more portions of said indexed digital media data dependent upon said speech query.

29. The method according to claim 28, further including the step of creating a word lattice from said speech query.

30. The method according to claim 29, further including the step of searching said indexed digital media data dependent upon said speech query by matching said word lattice created from said speech query with word lattices of said speech annotation of said indexed digital media data.

31. The method according to claim 30, further including the step of confidence filtering said lattice created from said speech query to produce a short-list for said searching step.

32. The method according to claim 29, wherein said word lattice is created dependent upon at least one of acoustic and linguistic knowledge.

33. The method according to claim 32, wherein said acoustic knowledge is based on a hidden Markov model.

34. The method according to claim 32, wherein said linguistic knowledge is an N-gram statistical linguistic model.

35. The method according to claim 28, further including the step of searching said indexed digital media data dependent upon a text query.

36. The method according to claim 28, wherein said speech query is generated dependent upon at least one of a customised vocabulary and Backus-Naur Form grammar.

37. An apparatus for voice retrieving digital media data annotated with speech, said apparatus including:

means for providing an indexed digital media data, said indexed digital media data derived from a word lattice created from a speech annotation of said digital media data, wherein said speech annotation is independent of a source digital media data;

means for generating a speech query; and means for retrieving one or more portions of said indexed digital media data dependent upon said speech query.

38. The apparatus according to claim 37, further including means for creating a word lattice from said speech query.

39. The apparatus according to claim 38, further including means for searching said indexed digital media data dependent upon said speech query by matching said word lattice created from said speech query with word lattices of said speech annotation of said indexed digital media data.

40. The apparatus according to claim 39, further including means for confidence filtering said lattice created from said speech query to produce a short-list for said searching means.

41. The apparatus according to claim 38, wherein said word lattice is created dependent upon at least one of acoustic and linguistic knowledge.

42. The apparatus according to claim 41, wherein said acoustic knowledge is based on a hidden Markov model.

43. The apparatus according to claim 41, wherein said linguistic knowledge is an N-gram statistical linguistic model.

44. The apparatus according to claim 37, further including means for searching said indexed digital media data dependent upon a text query.

45. The apparatus according to claim 37, wherein said speech query is generated dependent upon at least one of a customised vocabulary and Backus-Naur Form grammar.

46. An computer program product having a computer readable medium having a computer program recorded therein for voice retrieving digital media data annotated with speech, said computer program product including:
   means for providing an indexed digital media data, said indexed digital media data derived from a word lattice created from a speech annotation of said digital media data, wherein said speech annotation is independent of a source digital media data;
   means for generating a speech query; and
   means for retrieving one or more portions of said indexed digital media data dependent upon said speech query.

47. The computer program product according to claim 46, further including means for creating a word lattice from said speech query.

48. The computer program product according to claim 47, further including means for searching said indexed digital media data dependent upon said speech query by matching said word lattice created from said speech query with word lattices of said speech annotation of said indexed digital media data.

49. The computer program product according to claim 48, further including means for confidence filtering said lattice created from said speech query to produce a short-list for said searching means.

50. The computer program product according to claim 47, wherein said word lattice is created dependent upon at least one of acoustic and linguistic knowledge.

51. The computer program product according to claim 50, wherein said acoustic knowledge is based on a hidden Markov model.

52. The computer program product according to claim 50, wherein said linguistic knowledge is an N-gram statistical linguistic model.

53. The computer program product according to claim 46, further including means for searching said indexed digital media data dependent upon a text query.

54. The computer program product according to claim 46, wherein said speech query is generated dependent upon at least one of a customised vocabulary and Backus-Naur Form grammar.

55. A system for voice annotating and retrieving source digital media data, said system including:
   means for speech annotating at least one segment of said source digital media data with a speech annotation that is independent of the source digital media data to provide a speech annotated digital media data;
   means for indexing said speech-annotated digital media data by said speech annotation to provide an indexed digital media data;
   means for generating a speech or voice query; and
   means for retrieving one or more portions of said indexed digital media data dependent upon said speech query.

56. The system according to claim 55, further including means for creating a lattice structure from said speech annotation.

57. The system according to claim 56, wherein said means for creating said lattice structure is dependent upon at least one of acoustic and linguistic knowledge.

58. The system according to claim 57, wherein said acoustic knowledge is based on a hidden Markov model.

59. The system according to claim 57, wherein said linguistic knowledge is an N-gram statistical linguistic model.

60. The system according to claim 56, further including means for reverse indexing said lattice structure to provide a reverse index table.

61. The system according to claim 60, further including means for content addressing said reverse index table.

62. The system according to claim 55, wherein said speech-annotating means post-annotates said source digital media data.

63. The system according to claim 55, further including means for creating a lattice structure from said speech query.

64. The system according to claim 63, further including means for searching said indexed digital media data dependent upon said speech query by matching said lattice structure created from said speech query with lattice structures of said speech annotation of said indexed digital media data.

65. The system according to claim 64, further including means for confidence filtering said lattice structure created from said speech query to produce a short-list for said searching means.

66. The system according to claim 63, wherein said lattice structure is created dependent upon at least one of acoustic and linguistic knowledge.

67. The system according to claim 55, further including means for searching said indexed digital media data dependent upon a text query.

68. The system according to claim 55, wherein at least one of said annotating means and said speech query is dependent upon at least one of a customised vocabulary and Backus-Naur Form grammar.

69. A method of voice annotating source digital media data, said method comprising the steps of:
   speech annotating, independently of the source media data, one or more portions of said source media data using a formal spoken language;
   applying said annotated speech to a lattice engine and further applying at least one of acoustic and linguistic knowledge to said lattice engine to generate a word lattice;
   applying said word lattice to a reverse index engine to build a reversed index table for said lattice; and
   applying said reversed index table to an addressing engine module to create indexed media content.

70. An apparatus for voice annotating source digital media data, comprising:
   means for speech annotating, independently of the source media data, one or more portions of said source media data using a formal spoken language;
   means for applying said annotated speech to a lattice engine and further applying at least one of acoustic and linguistic knowledge to said lattice engine to generate a word lattice;
   means for applying said word lattice to a reverse index engine to build a reversed index table for said lattice; and
   means for applying said reversed index table to an addressing engine module to create indexed media content.

71. A computer program product having a computer readable medium having a computer program recorded therein for voice annotating source digital media data, said computer program product including:

means for speech annotating, independently of the source media data, one or more portions of said source media data using a formal spoken language;

means for applying said annotated speech to a lattice engine and further applying at least one of acoustic and linguistic knowledge to said lattice engine to generate a word lattice;

means for applying said word lattice to a reverse index engine to build a reversed index table for said lattice; and means for applying said reversed index table to an addressing engine module to create indexed media content.

* * * * *